(12) United States Patent
Werner (10) Patent No.: US 6,397,296 B1
(45) Date of Patent: May 28, 2002

(54) TWO-LEVEL INSTRUCTION CACHE FOR EMBEDDED PROCESSORS

(75) Inventor: Tony L. Werner, Santa Clara, CA (US)

(73) Assignee: Hitachi Ltd., Tarrytown, NY (US)

( * ) Notice: Subject to any disclaimer, the term of this patent is extended or adjusted under 35 U.S.C. 154(b) by 0 days.

(21) Appl. No.: 09/252,838

(22) Filed: Feb. 19, 1999

(51) Int. Cl.[7] .............................................. G06F 12/00
(52) U.S. Cl. ........................ 711/122; 711/119; 711/137
(58) Field of Search ................................ 711/137, 122, 711/119

(56) References Cited

U.S. PATENT DOCUMENTS

| | | | | |
|---|---|---|---|---|
| 5,317,718 A | * | 5/1994 | Jouppi ......................... | 711/137 |
| 5,499,355 A | * | 3/1996 | Krishnamohan et al. .... | 395/464 |
| 5,603,004 A | * | 2/1997 | Kurpanek et al. .......... | 395/445 |
| 5,758,119 A | * | 5/1998 | Mayfield et al. ............ | 395/449 |
| 5,860,095 A | * | 1/1999 | Iacobovici et al. ......... | 711/119 |
| 5,944,815 A | * | 8/1999 | Witt ............................ | 712/207 |
| 6,279,084 B1 | * | 8/2001 | VanDoren et al. .......... | 711/141 |

OTHER PUBLICATIONS

Johnson Kin, Munish Gupta, and William H. Mangione–Smith. The Filter Cache: An Energy Efficient Memory Structure. Proceedings of the 30th Annual International Symposium on Microarchitecture, pp. 184–193, Nov. 1997.
Norman P. Jouppi. Improving Direct–Mapped Cache Performance by the Addition of a Small Fully–Associative Cache and Prefetch Buffers. WRL Research ote TN–14, Mar. 1990.

James E. Bennett and Michael J. Flynn. Reducing Cache Miss Rates Using Prediction Caches. Technical Report No. CSL–TR–96–707, Computer Systems Laboratory, Stanford University, Oct. 1996.

Subbarao Palacharla and R.E. Kessler. Evaluating Stream Buffers as a Secondary Cache Replacment. Proceedings of the 21st Annual International Symposium on Computer Architecture, Apr. 1994.

* cited by examiner

*Primary Examiner*—Matthew Kim
*Assistant Examiner*—Pierre M. Vital
(74) *Attorney, Agent, or Firm*—R. Michael Ananian; Flehr Hohbach Test Albritton & Herbert LLP (57) ABSTRACT

A cache system has a multilevel cache architecture. An L1 cache receives instructions from an external memory. An L0 cache has a first predetermined number L0 of cache lines for receiving instructions from the L1 cache. An assist cache has a victim cache and a prefetch cache. The victim cache stores a second predetermined number VC of cache lines, and the prefetch cache stores a third predetermined number PC of cache lines. The victim cache receives instructions from the L0 cache. The prefetch cache receives instructions from the L1 cache. A victim filter stores a fourth predetermined number VF of addresses wherein VF is a function of L0 and a number of cache writes. The number of cache writes to the L0 and the victim cache is reduced relative to using the L0 cache without the assist cache.

26 Claims, 8 Drawing Sheets

TWO-LEVEL INSTRUCTION CACHE FOR EMBEDDED PROCESSORS

FIELD OF THE INVENTION

This present invention relates generally to a cache in a microprocessor system, and more particularly to a method and apparatus for an assist cache.

BACKGROUND OF THE INVENTION

As processor speed continues to increase at a faster rate than memory speed, memory speed has become increasingly critical. A cache is a type of buffer that is smaller and faster than the main memory. The cache is disposed between the processor and the main memory. To improve memory speed, the cache stores a copy of instructions and data from the main memory that are likely to be needed next by the processor.

Caches can use a single buffer or multiple buffers with each buffer having a different speed or latency. Latency is the number of clock cycles required to access the data or instructions stored in the memory or cache.

In the past, microprocessors were constructed with single-cycle on-chip caches to reduce memory latency. In many current high performance microprocessors, instruction and data memory references now require two clock cycles, instead of a single clock cycle. Consequently, the execution unit of the processor requires additional states to access the memory, which increases both the amount of hardware and the branch penalty. Increasing the amount of hardware increases power and cost. Increasing the branch penalty reduces performance.

Since performance is critical in any processor application, branch prediction and branch target buffers are used to reduce the branch penalty, which incurs yet more hardware. However, embedded processors target design goals towards improving performance (speed) per dollar and performance per watt instead of raw performance. Adding more pipeline stages in the execution unit and increasing the amount of hardware is not a satisfactory solution for meeting the requirements demanded by embedded processors.

The cache stores the instructions that were copied from the main memory in cache lines. A cache line may store one or many consecutive instructions. Each cache line also has a tag that is used to identify the memory address of the copied instructions. In its simplest form, a tag is the entire address. When a cache line stores multiple instructions, the entire address does not need to be stored. For example, if a cache line stores eight bytes, the three least significant bits of the address need not be stored in the tag.

A cache hit occurs when a requested instruction is already stored in the cache. A cache miss occurs when the requested instruction is not stored in the cache. Typically, when a cache miss occurs, the execution unit must wait or stall until the requested instruction is retrieved from the main memory before continuing the execution of the program causing processor performance to degrade. The number of cache hits and misses is used as a measure of computer system performance.

Multi-level caches typically have two buffers, that will be referred to as L0 and L1 caches, which have different speeds or memory latency access time. Typically, the L1 cache is slower than the L0 cache. The L1 cache receives instructions and data from the main memory. The L0 cache typically receives instructions and data from the L1 cache to supply to the execution unit.

The cache lines of the caches can also be direct mapped, fully associative or set associative with respect to the memory addresses. A fully associative cache does not associate a memory address with any particular cache line. Instructions and data can be placed in any cache line. A direct mapped cache associates a particular cache line with each memory address and places the instructions or data stored at a particular address only in that particular cache line. A set associative cache directly maps sets or groups of consecutive cache lines to particular memory locations. However, within a set of cache lines, the cache is fully associative.

Direct mapped caches have the fastest access time but tend to develop hot spots. A hot spot is a repeated miss to the same cache line. Fully associative caches have a better hit rate than direct mapped caches, but have a slower access time than direct mapped caches. With respect to access time, set associative caches are between direct mapped caches and fully associative caches.

A victim cache is a fully associative cache that stores cache lines that were displaced from the L0 cache. A victim cache line is a cache line in the L0 cache that is being replaced. In one cache system, on every cache miss, the victim cache line is copied to the victim cache. If the victim cache is full, then the new victim cache line replaces the least recently used cache line in the victim cache. When a cache miss occurs in the L0 and L1 caches, the cache determines if the requested instruction or data is stored in the victim cache, and if so the cache provides that instruction from the victim cache to the execution unit.

The victim cache improves performance by storing frequently accessed cache lines after at least one cache miss occurred. Another technique is also used to prevent cache misses. A prefetch technique uses a stream buffer to fetch instructions and data into the cache before successive cache misses can occur. When a miss occurs, the stream buffer prefetches successive instructions beginning with the missed instruction into the stream buffer. Subsequent cache accesses compare the requested address not only to the addresses or tags of the L1 and L0 caches but also to the tag of the stream buffer. If the requested instruction is not in the L1 or L0 caches but is in the stream buffer, the cache line containing the requested instruction is moved from the stream buffer into the L1 or L0 caches. However, the stream buffer uses additional space on the chip and increases power consumption.

Energy efficiency is important. The victim cache and the stream buffer both improve performance, but also increase the hardware complexity, cost and power consumption.

Thus, a cache configuration that solves the problem of providing an acceptable cache hit rate while maintaining single-cycle access latency is desirable. Furthermore, it is also desirable that the proposed cache configuration reduce power consumption and hardware requirements, which are critical design constraints for embedded microprocessors.

SUMMARY OF THE INVENTION

Therefore, it is an object of the present invention to provide an improved apparatus for and method of operating a cache.

It is a related objective of the invention to create an improved method and apparatus for reducing power consumption of the cache.

These and other objectives and advantages of the present invention are achieved by utilizing a multilevel cache with an assist cache and assist filter. The assist cache stores both displaced cache lines (victims) from the L0 cache and prefetches cache lines from the L1 cache. In one embodiment, a particular mix of victim cache lines and prefetch cache lines in the assist cache is hard-wired. In an alternate embodiment, the particular mix of cache lines is dynamically allocated.

More particularly, an L1 cache receives instructions from an external memory. An L0 cache has a first predetermined number L0 of cache lines for receiving instructions from the L1 cache. An assist cache has a victim cache and a prefetch cache. The victim cache stores a second predetermined number VC of cache lines, and the prefetch cache stores a third predetermined number PC of cache lines. The victim cache receives instructions from the L0 cache. The prefetch cache receives instructions from the L1 cache. A victim filter stores a fourth predetermined number VF of addresses wherein VF is a function of L0 and a number of cache writes. The number of cache writes to the L0 and the victim cache is reduced relative to using the L0 cache without the assist cache.

Other features and advantages of the present invention would become apparent to a person of skill in the art who studies the present invention disclosure. Therefore, a more detailed description of a preferred embodiment of the invention is given with respect to the following drawings.

DETAILED DESCRIPTION OF THE PREFERRED EMBODIMENTS

Figure 1:
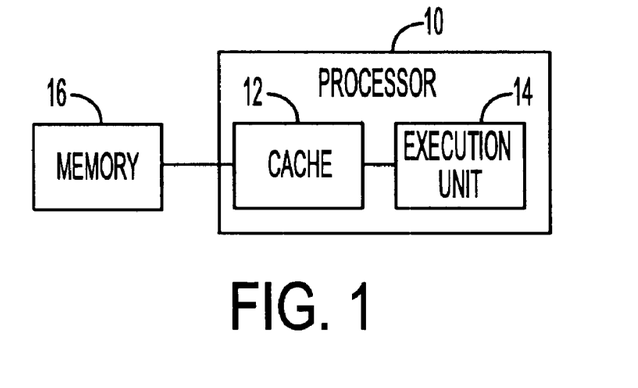
FIG. 1 is a block diagram of a processor and memory suitable for use with the present invention.

FIG. 1 is a block diagram of a processor and memory suitable for use with the present invention. A processor 10 has a cache system 12 that supplies instructions to an execution unit 14. The cache system 12 retrieves instructions from an external memory 16. In an alternate embodiment, the memory 16 is on the same chip as the processor 10.

Figure 2:
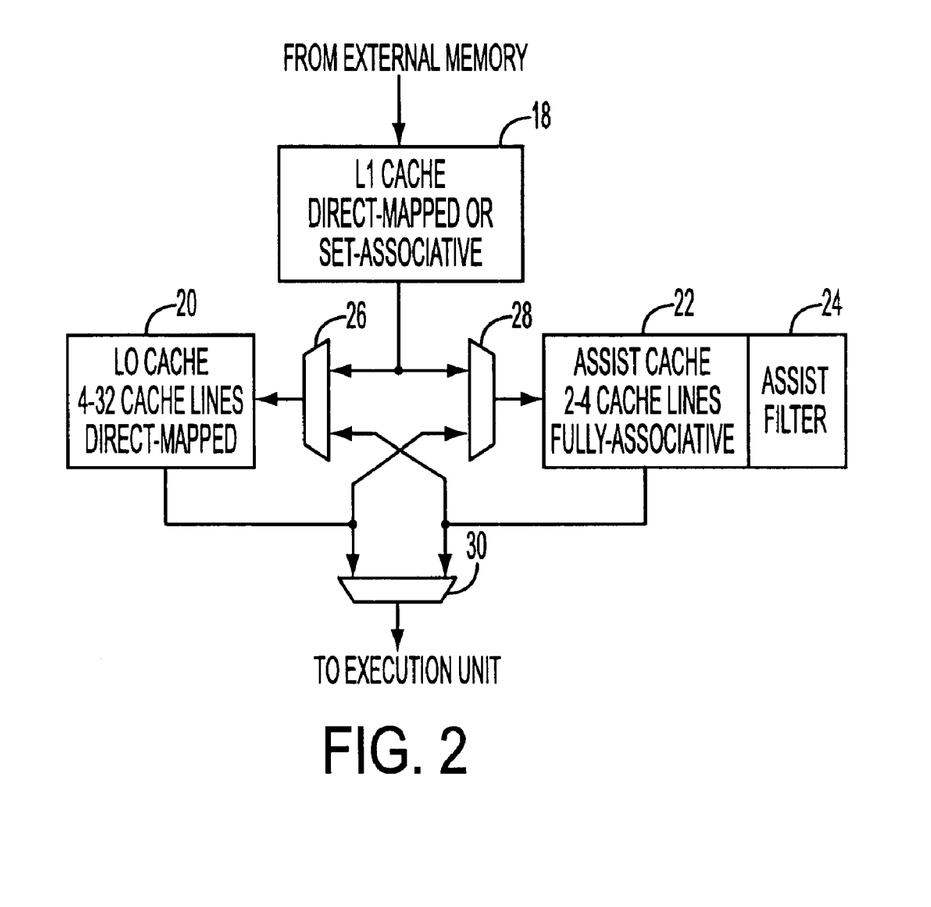
FIG. 2 is a block diagram of the cache architecture of the present invention.

Referring next to FIG. 2, a more detailed block diagram of the cache architecture of the cache system 12 of the present invention is shown. The cache system 12 (see FIG. 1) includes an L1 cache 18, an L0 cache 20 and an assist cache 22. An assist filter 24 is used with the assist cache 22. Multiplexers 26, 28 and 30 interconnect the L1 cache 18, the L0 cache 20, the assist cache 22 and the execution unit 14. The L1 cache 18 is direct mapped, stores 16,384 (16 K) bytes and is accessed in two clock cycles. In an alternate embodiment, the L1 cache 18 is set-associative. The L0 cache 20 stores 256 bytes or sixty-four cache lines. The assist cache 22 is fully associative, is accessible in a single clock cycle, and has four cache lines storing 128 bytes. Alternately, the assist cache 22 stores sixty-four bytes in two cache lines or ninety-six bytes in three cache lines. Preferably the L1 cache 18, the L0 cache 20 and assist cache 22 have the same number of bytes in a cache line. In one embodiment the cache line stores thirty-two bytes.

Figure 3:
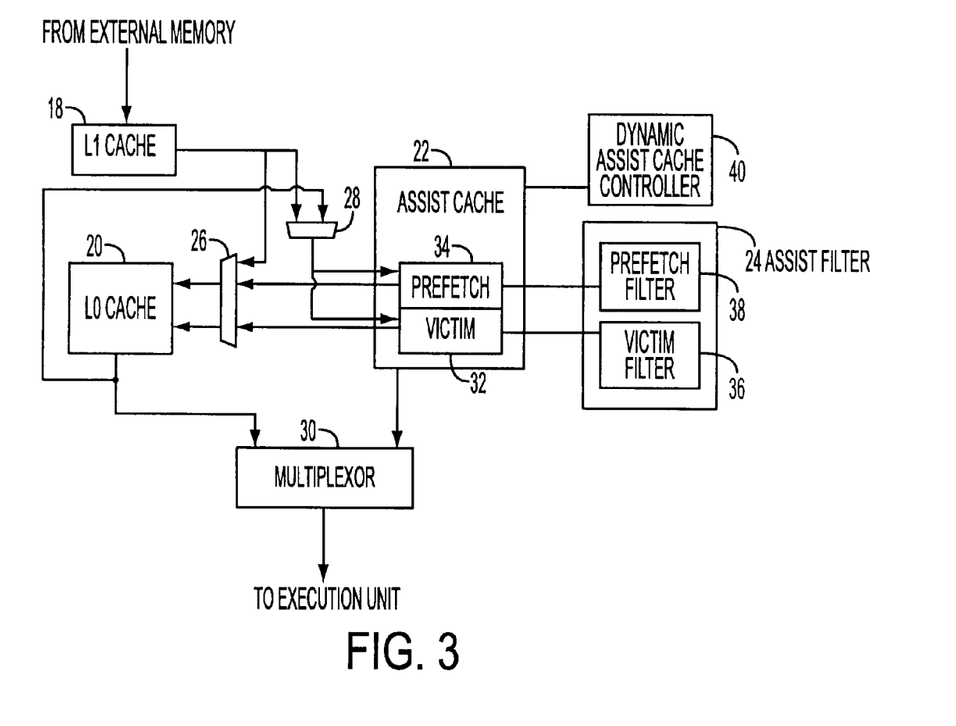
FIG. 3 is a detailed block diagram of the assist cache and assist filter of FIG. 2.

More specifically, referring to FIG. 3, a detailed block diagram of the assist cache 22 and assist filter 24 of FIG. 2 is shown. The assist cache 22 has a victim cache 32 and a prefetch cache 34. The victim cache 32 includes a first set of cache lines for storing instructions that were displaced from the L0 cache 20. The prefetch cache 34 includes a second set of cache lines for storing instructions received from the L1 cache 18. The assist filter 24 includes a victim filter 36 and a prefetch filter 38. The victim filter 36 has a victim memory for storing a set of addresses or tags. The execution unit requests an instruction from a requested address. The victim cache 32 is responsive to the victim filter 36. When a requested instruction is not stored in the L0 cache 20 or assist cache 22, the L0 cache 20 identifies a cache line to replace (a victim cache line) in the L0 cache and the victim filter 36 determines if a portion of the requested address matches an address stored in the victim filter 36. If the portion of the requested address matches one of the addresses stored in the victim filter 36, the victim filter 36 copies the victim cache line from the L0 cache into the victim cache 32. The L0 cache 20 also reconstructs a portion of the address of the victim cache line and stores the reconstructed address as a cache line tag with the victim cache line in the victim filter 36.

The prefetch filter 38 is used with the prefetch cache 32 to filter addresses before prefetching an instruction to store in the prefetch cache when a cache miss occurs. Therefore, the prefetch filter 38 reduces the number of prefetches from the L1 cache and external memory. In an alternate embodiment, the prefetch filter is not used and instructions are prefetched on every cache miss. The prefetch filter 38 significantly reduces the number of memory accesses when compared to the prefetch on every miss approach. Therefore, by reducing the number of memory accesses, the prefetch filter 38 reduces power consumption.

A dynamic assist cache controller 40 controls the assist cache 22 to dynamically allocate the cache lines of the assist cache 22 between the prefetch cache 34 and the victim cache 32. In one embodiment, an application program dynamically allocates the prefetch cache 34 to the victim cache 32 at compile time. In another embodiment, the prefetch cache 34 is dynamically allocated to the victim cache 32 at run-time when the processor is executing an application program. The dynamic allocation is controlled by a specialized register that contains configuration information as is well known in this field. In this case, one or more bits in a specialized register could control the allocation. An instruction will set the configuration by writing to the specialized register. Typically, the instruction will also be unique.

In an alternate embodiment, no dynamic assist cache controller 40 is used. The prefetch cache 34 is hard-wired and is not assignable to the victim cache 32.

Figure 4:
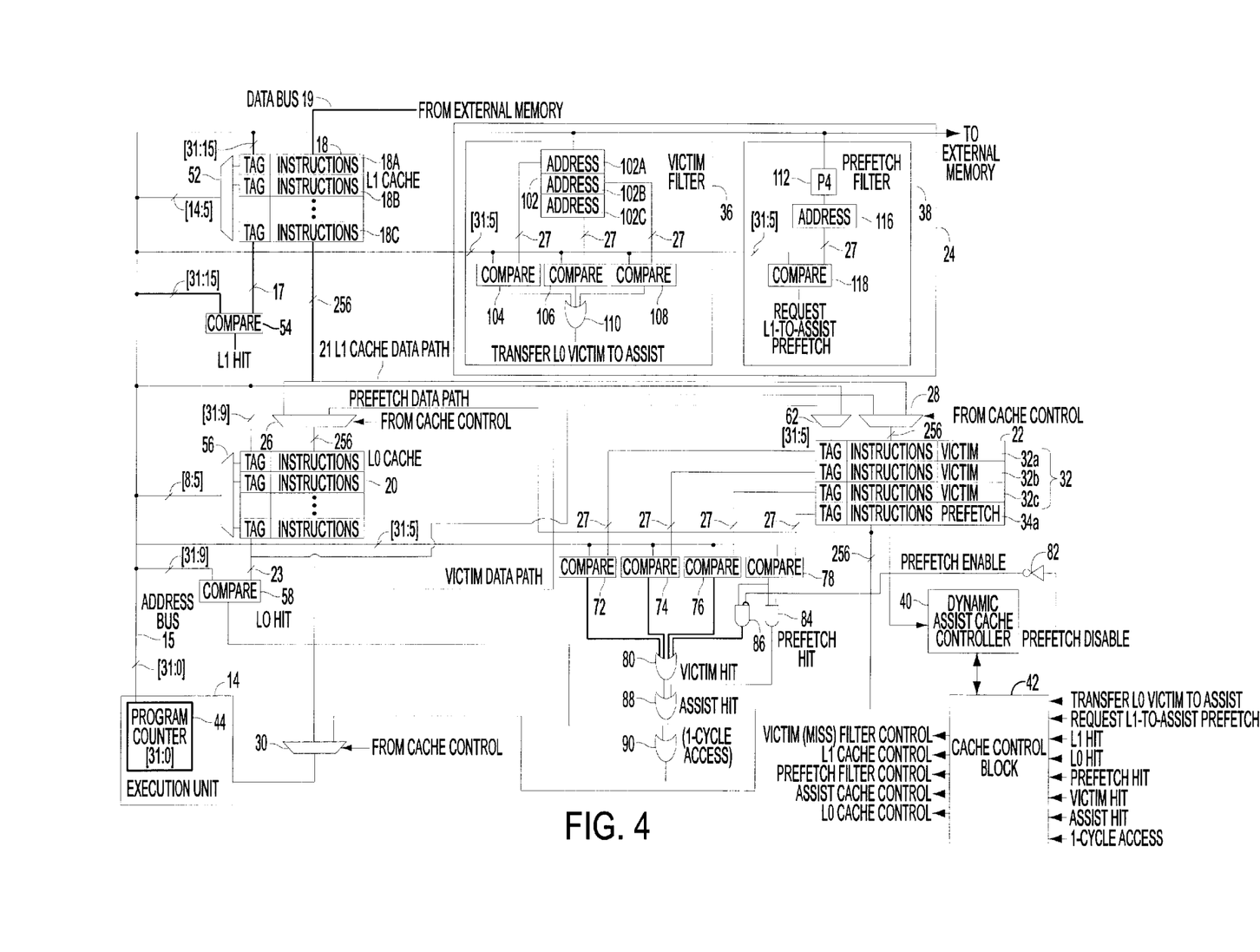
FIG. 4 is a detailed diagram of one embodiment of the cache architecture of FIG. 3.

FIG. 4 depicts the address and data path of the cache system 12 of the present invention, including a portion of the control logic including a cache control block 42 and the dynamic assist cache controller 40. The execution unit 14 has a program counter 44 that stores the address of the next instruction to be retrieved, that is, the address of the requested instruction and outputs that address onto the address bus 15.

The L1 cache 18 connects to the data bus 19 to receive the instructions from the external memory. In this embodiment, the L1 cache is a direct mapped, 32 K byte cache with thirty-two byte cache lines, 18a, 18b, and 18c, and has a two-cycle access latency. Each cache line 18a, 18b, and 18c of the L1 cache 18 stores a tag and a set of instructions. In one embodiment, the tag is the address of the first byte stored in the cache line. Since the cache lines store thirty-two bytes, the five least significant bits (bits 4:0) of the address are not stored in the tag. In a direct mapped cache, since the cache line position is a function of the address, the size of the tag can be further reduced. In particular, since the L1 cache 18 stores 32 K bytes and each cache line is thirty-two bytes wide, the L1 cache 18 stores 1,024 cache lines which is equivalent to $2^{10}$ and is represented by ten bits. Therefore, ten bits of the address need not be stored in the tag. As shown in FIG. 4, address bits [14:5] are input to a multiplexor 52 to store both the instruction and the most significant address bits [31:15] in the appropriate cache line.

A comparator 54 compares a portion of the requested address which is supplied by the program counter 44 to the tags stored in each cache line. If the portion of the requested address is the same as one of the tags, then the comparator 54 outputs a signal called L1 hit to the cache control block 42 to indicate that a hit occurred in the L1 cache 18. The cache control block 42 causes the cache line that stores the requested instruction to be transferred from the L1 cache 18 to the L0 cache 20 via the L1 cache data path 21 and multiplexor 26. Then the cache control block 42 transfers the requested instruction from the L0 cache 20 to the pipeline in the execution unit 14 via multiplexor 30.

In this embodiment, the L0 cache 20 is a direct mapped, 512 byte cache with a thirty-two byte cache line and therefore has sixteen cache lines. The L0 cache 20 also stores a tag and a set of instructions on each cache line. Since the L0 cache 20 is direct mapped, a multiplexor 56 uses address bits [8:5] to store the instruction or data in one of the sixteen cache lines. The tag for the L0 cache 20 stores bits thirty-one through nine of the address.

A comparator 58 compares a portion of the requested address (bits [31:9]) to the tags stored in the L0 cache 20. If the portion of the requested address is the same as one of the tags stored in the L0 cache 20, then the comparator 58 outputs a signal called L0 hit to the cache control block 42 to indicate that a hit occurred in the L0 cache 20. In response to the L0 hit signal, the cache control block 42 causes the instruction at the requested address to be output from the L0 cache 20 to the pipeline of the execution unit 14 via the multiplexor 30.

The assist cache 22 is a fully associative, 128 byte cache with a thirty-two byte cache line, and therefore has four cache lines. The assist cache 22 stores a tag and a set of instructions on each cache line. The assist cache 22 has three victim cache lines, 32a, 32b and 32c, and a single prefetch cache line 34a. The victim cache lines are a part of the victim cache 32. The prefetch cache line 34a is a part of the prefetch cache 34. In an alternate embodiment, the prefetch cache 34 has more than one prefetch cache line. As described above, with respect to FIG. 3, the prefetch cache line 34a can be designated as a victim cache line and included in the victim cache 32. A multiplexor 28 supplies both victim cache lines from the L0 cache 20 to store in the victim cache 32 and prefetched cache lines from the L1 cache 18 that are stored in the prefetch cache 34.

A multiplexor 62 supplies the tag from the victim cache line of the L0 cache 20 to the appropriate cache line of the victim cache 32, and also supplies the tag from the address bus 15 to the prefetch cache 34. Because the tag of the L0 cache stores bits 31:9 and the tag of the assist cache stores bits 31:5, logic in the L0 cache 20 reconstructs bits 8:5 and the L0 cache 20 supplies bits 31:5 to multiplexor 62 to store in the appropriate cache line tag of the victim cache 32.

When a cache line is transferred from the L0 cache 20 or the L1 cache 18 to the assist cache 22, the address of the transferred instruction is supplied to the address bus 15 by the program counter 44. Bits 31:5 of that address are stored as the tag of the transferred cache line in the victim cache 32 or prefetch cache 34 via the multiplexor 62.

A set of comparators 72–78 compares the tags stored in each cache line of the assist cache 22 to the requested address output by the program counter 44. If the tags match a corresponding portion of the requested address, then the comparators 72–78 output a high voltage level to indicate that a hit occurred in that cache line of the assist cache 22. The outputs of the comparators 72–76 are supplied to an OR-gate 80 to generate a victim hit signal that indicates a hit in the victim cache 32 which is supplied to the cache control block 42.

The tag of the prefetch cache line 34a connects to comparator 78. The dynamic assist cache controller 40 generates a disable prefetch signal, which has a high voltage level, when the prefetch cache line 34a is used as a cache line of the victim cache 32. The disable prefetch signal is supplied to inverter 82 to generate a prefetch enable signal that has a high level when the disable prefetch signal has a low level. In other words, the prefetch enable signal has a high voltage level when the prefetch cache line is used for prefetching instructions. The AND-gate 84 generates a prefetch hit signal when prefetch enable is at a high voltage level and comparator 78 indicates that the prefetch cache 34 has a match. The prefetch hit signal is supplied to the cache control block 42. The AND-gate 86 is enabled when the prefetch cache line is used as part of the victim cache. The AND-gate 86 generates a victim cache-line hit signal that is supplied to OR-gate 80 when the prefetch enable signal is at a low voltage level and the comparator 78 indicates that the prefetch cache 34 has a match.

When either the victim hit signal or the prefetch hit signal is at a high voltage level, an OR-gate 88 generates an assist hit signal to indicate that a hit occurred in the assist cache.

When either the assist hit signal or the L0 hit signal is at a high voltage level, another OR-gate 90 generates a 1-cycle-access signal to indicate that instructions are available and that the pipeline in the execution unit 14 can proceed.

The victim filter 36 has a memory 102, such as a FIFO, that stores three addresses in entries 102a, 102b and 102c. The entries 102a, 102b, and 102c store the last three missed addresses. This is not necessarily the same as the addresses in the assist cache 32. Each entry 102a, 102b, 102c is input to a comparator 104, 106 and 108, respectively. The requested address output by the program counter 44 is also supplied to the comparators 104, 106 and 108. If any of the addresses stored in the entries 102a, 102b, 102c matches the requested address, that comparator outputs a high voltage level. The outputs of the comparators 104, 106 and 108 are input to an OR-gate 110 to generate a transfer-L0-victim-to-assist cache signal. In response to the transfer-L0-victimto-assist cache signal, the cache control block 42 causes the cache line that stores the instruction at the matching address of the L0 cache 20 to be transferred from the L0 cache 20 to the victim cache 24 of the assist cache 22.

The prefetch filter 38 has an incrementer 112, a multiplexor 114 and a memory 116. The incrementer 112 increments the address output by the program counter 44 by a predetermined amount, such as four for thirty-two bit instructions. The memory 116 stores the next address to prefetch and is loaded from the incrementer 112. The address bits stored in the memory 116 correspond to the address bits stored in the tag of the assist cache 22. A comparator 118 compares the address stored in the memory 116 of the prefetch filter 38 to the requested address and outputs a high voltage level if there is a match. The output of comparator 118 is the request-L1-to-assist-prefetch signal that causes the cache control bock 42 to generate signals to transfer the cache line from the L1 cache 18 on the L1 data path 21 to the prefetch cache 23 via the multiplexor 62.

Although the prefetch cache line is dynamically assignable, the prefetch filter 38 is separate from the victim filter 36. Moreover, the prefetch filter 38 is not dynamically assigned to the victim filter 36 even if the prefetch cache 34 is dynamically assigned to the victim cache 32.

The cache control block 42 receives the L1 hit, transfer L0 victim to assist, request L1 to assist prefetch, prefetch hit, victim hit assist hit and 1-cycle access signals and generates control signals. The control signals include a victim filter control, L1 cache control, prefetch filter control, assist cache control and L0 cache control signals.

A noteworthy feature of the present invention is that the assist cache stores both displaced cache lines (victims) from the L0 cache 20 and prefetches cache lines from the L1 cache 18. In short, on each cycle, the program counter supplies a requested address to the address bus 15 and the L1 cache 18, the L0 cache 20, the assist cache 24, the victim filter 36 and the prefetch filter 38 simultaneously compare their respective stored tags and addresses with the requested address. If a cache hit is detected in either the L0 cache 20 or a victim cache line of the assist cache 22, the requested instruction or data stored in the cache line is provided to the execution unit of the processor in a single cycle and the instruction or data is transferred to the L0 cache 20. After the transfer to the L0 cache 20, the prefetch designated cache line of the assist cache is marked invalid and the prefetch cache line can accept additional prefetch data. If the requested address misses in both the L0 cache 20 and the assist cache 22 but hits in the L1 cache 18, then the pipeline stalls while the instruction is read from the L1 cache 18 on the subsequent clock cycle, assuming a two-cycle access time for the L1 cache 18.

In addition, based on a match in the victim filter 36, the L0 cache 20 receives the instruction from the L1 cache 18 and the assist cache 22 receives a new victim from the L0 cache 20 and discards the least recently used cache line of the victim cache 32. The victim filter 36 stores a set of addresses that have missed in the L0 cache 20 and L1 cache 18. On a miss, a victim cache line is not stored in the victim cache 32 unless that same cache line of the L0 cache 20 had a previous miss, and it's address is stored in the victim filter 36. In this way, power consumption is reduced by reducing the number of writes to the victim cache.

Figure 5:
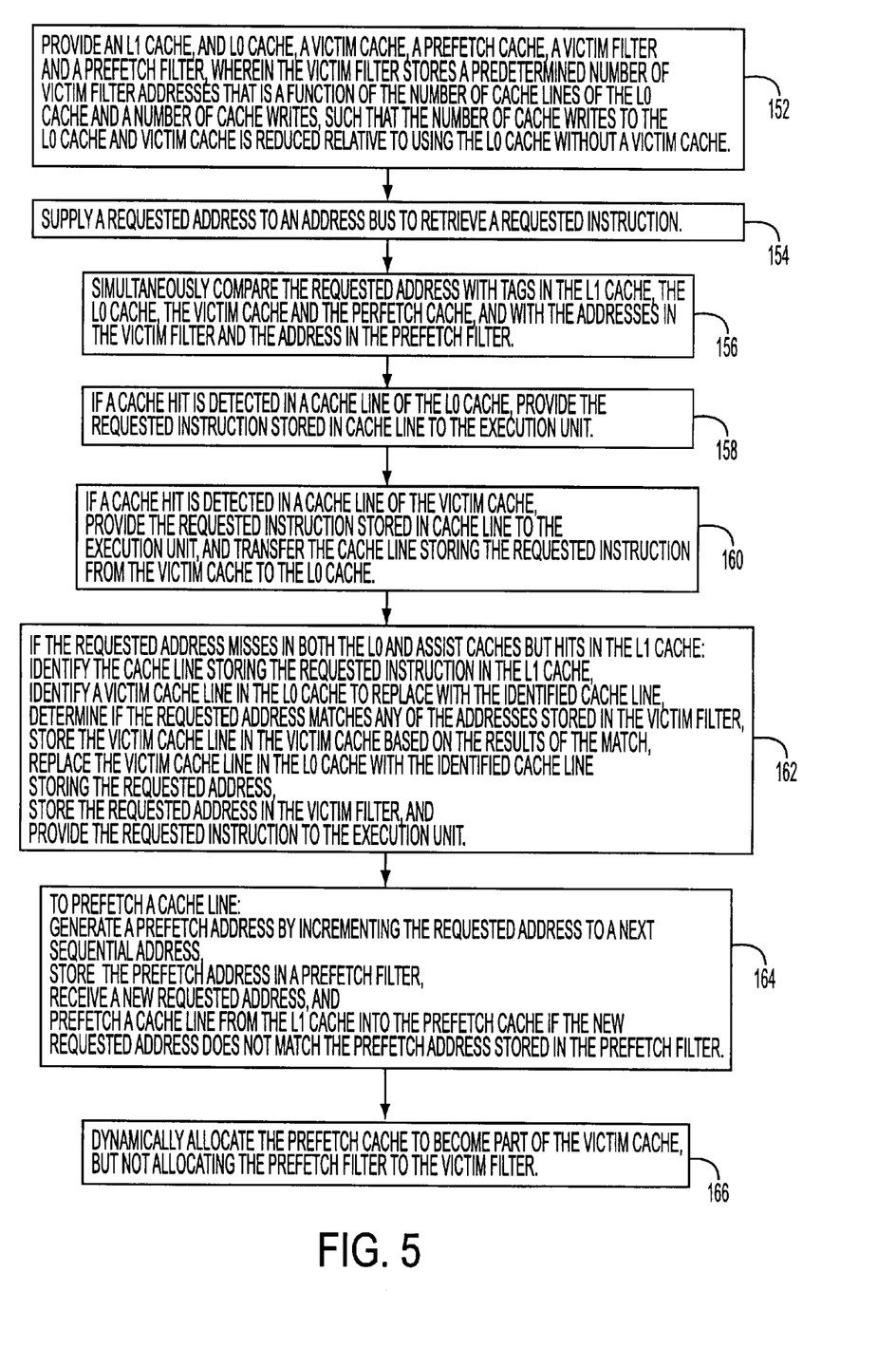
FIG. 5 is a flowchart of a method of using the cache of the present invention.

FIG. 5 is a flowchart of one embodiment of a method of using the cache of the present invention. In step 152, an L1 cache, an L0 cache, a victim cache, a prefetch cache, a victim filter, and a prefetch filter are provided. The L1 cache, the L0 cache, the victim cache, and the prefetch cache, all store cache lines. In each cache line, at least a portion of the address is stored as an L1 tag, an L0 tag, a victim cache tag, and a prefetch cache tag. The a victim filter and prefetch filter store victim filter addresses and prefetch filter address, respectively. The victim filter stores a predetermined number of victim filter addresses that is a function of the number of cache lines of the L0 cache and a number of cache writes, such that the number of cache writes to the L0 cache and victim cache is reduced relative to using the L0 cache without a victim cache.

In step 154, a requested address is supplied to an address bus to retrieve a requested instruction. In step 156, the requested address is simultaneously compared with the L1 tags, the L0 tags, the victim tags, the prefetch tags, the victim filter addresses, and the prefetch filter addresses. In step 158, if a cache hit is detected in a cache line of the L0 cache, the requested instruction that is stored in the cache line is provided to the execution unit.

In step 160, if a cache hit is detected in a cache line of the victim cache, the requested instruction stored in the cache line that generated the hit is provided to the execution unit. The cache line storing the requested instruction from the victim cache is not transferred to the L0 cache. Instead, the cache line remains in the victim cache. Only prefetch cache lines make the transfer from Assist to L0.

In step 162, if the requested address misses in both the L0 and assist caches but hits in the L1 cache, the cache line storing the requested instruction in the L1 cache is identified. A victim cache line in the L0 cache to replace with the identified cache line is also identified. If the requested address matches any of the addresses stored in the victim filter, the victim cache line is stored in the victim cache based on the matching of the requested address of the victim filter of the determining step. The victim cache replaces the least recently used victim cache line with the new victim cache line. The victim cache line in the L0 cache is replaced with the identified cache line. The requested address is stored in the victim filter and the requested instruction is provided to the execution unit.

In step 164, to prefetch a cache line, a prefetch address is generated by incrementing the requested address to a next sequential address. The prefetch address is stored in a prefetch filter. A new requested address is stored, if the new requested address does not match the prefetch address stored in the prefetch filter. In this way, cache lines are prefetched from the L1 cache into the prefetch cache using the prefetch filter after misses to first and second requested sequential addresses.

In step 166, the prefetch cache is dynamically allocated to become part of the victim cache to increase the number of cache lines stored in the victim cache, but the prefetch filter is not allocated to the victim filter.

Typically victim caches implement a least recently used replacement technique to retain those cache lines that are displaced most often. Further performance improvement can be attained by increasing the size of the victim cache. In effect, with increased size, the victim cache retains more of the most frequently accessed cache lines. However, because the victim cache is fully associative, increasing the size of the victim cache increases the cost of implementation, which is inconsistent with the general design constraints of embedded processors.

In one embodiment, a victim filter is not used and the victim cache accepts every displaced cache line. However, in a preferred embodiment, the victim filter stores the most frequently accessed cache lines in the victim cache. The victim filter monitors recent cache misses to determine which cache lines to retain and displace by storing a set of tags of the most recently missed cache lines in the L0 and assist caches. In one embodiment, the victim cache filter uses a FIFO buffer to stores the addresses. When a miss occurs in the L0 or the assist cache, the displaced cache line (victim) from the L0 cache is stored in the victim cache only if a hit is detected in the victim filter.

Figure 6:
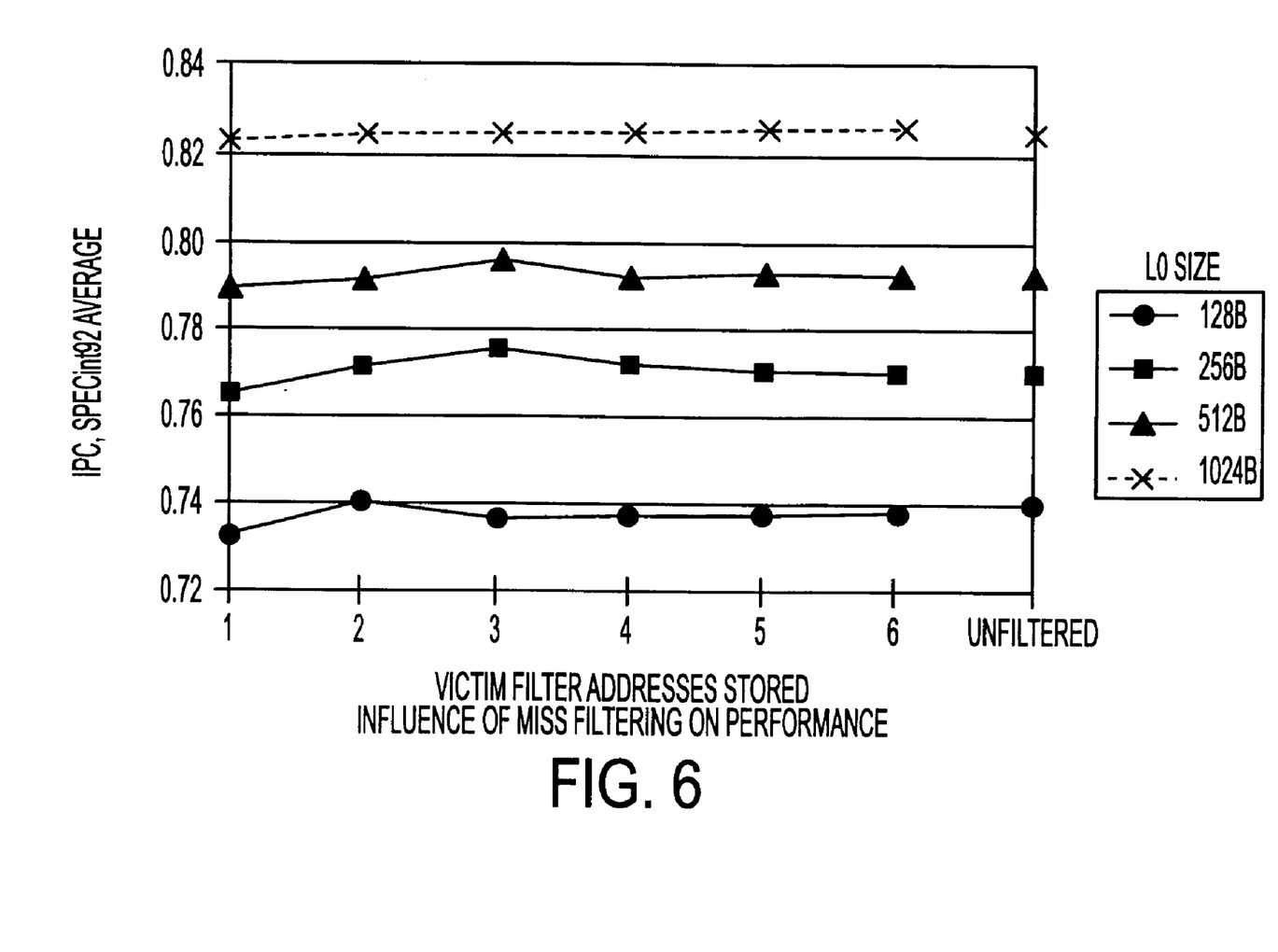
FIG. 6 is a graph of the average number of instructions per cycle (IPC) as a function of the number of addresses stored in the victim filter for various sizes of the L0 cache.

FIG. 6 is a graph of the average number of instructions per cycle (IPC) (y-axis) with respect to the number of addresses stored in the victim filter (x-axis) from the results of a simulation. In the simulation, all caches had a thirty-two byte cache line. The L1 cache was direct-mapped and stored 16 K bytes or 512 cache lines. The assist cache stored four cache lines. The number of victim filter addresses was varied from one to sixty-four and the size of the direct-mapped L0 cache was varied from 128 bytes (4 cache lines) to 1,024 bytes (thirty-two cache lines). The simulation results presented in FIGS. 6, 7A, 7B and 8 were obtained by processing trace files of the eight SPEC92 integer benchmarks from a MIPS R3000 processor instruction set.

In the simulations, both the L0 and assist caches are accessed in a single cycle, and the L1 cache is accessed in two clock cycles. For each memory reference, address and tag comparisons are performed simultaneously for the L1, L0 and assist caches. Simultaneous tag comparison improves cache performance because the L1 cache provides the requested instruction or data to the execution unit in the next clock cycle. If a hit was detected in the L0 or assist cache, the simulation assumed that a read from the L1 cache is stopped before substantial power is consumed such as in driving the column lines and sense amplifiers. The simulation model used a single read and write port for each cache. Therefore, prefetching from the L1 cache stalled if the assist cache was busy loading a victim from the L0 cache. The reported values for the instructions per cycle (IPC) do not include other architectural or data flow affects such as branch penalties, branch prediction, data dependencies, interrupts and the like. Furthermore, fetching instructions and data from external memory was assumed to require sixteen cycles. Therefore, the reported IPC values provide an upper bound on the overall system performance. For the simulations, the size of the L0 cache was varied from thirty-two to 1,024 bytes, that is, from one to thirty-two cache lines, respectively. However, in another preferred embodiment, for energy efficiency, the practical limit of the size of the L0 cache is 256 bytes or eight cache lines.

In a preferred implementation, the size of the L1 cache ranges from 16 K to 32 K and the size of the L0 cache ranges from 128 to 256 bytes. Similarly, although the number of cache lines in the assist cache was varied from one to six, in practice, the assist cache has four or fewer cache lines.

In particular, FIG. 6 shows the results for victim filter sizes that store from one to six addresses, and the result when there is no victim filter (labeled as "Unfiltered"). The unfiltered result provides an upper bound on the amount of reads and writes to memory. The average number of instructions per cycle is substantially independent of the number of cache lines of the victim filter. However, for the 256 byte L0 cache, a victim filter storing three addresses improved performance by approximately one percent over the unfiltered cache configuration.

More importantly, the inventor realized that the number of cache lines stored in the victim filter has a substantial impact on the amount of memory traffic. Power dissipation is correlated to the amount of memory activity in the L1, L0 and assist caches, such as the number of writes to L1, L0 and assist caches. For a coarse comparison, a read or write into either the L0 cache or the assist cache requires 20% of the energy that is required to access the L1 cache.

Figure 7A:
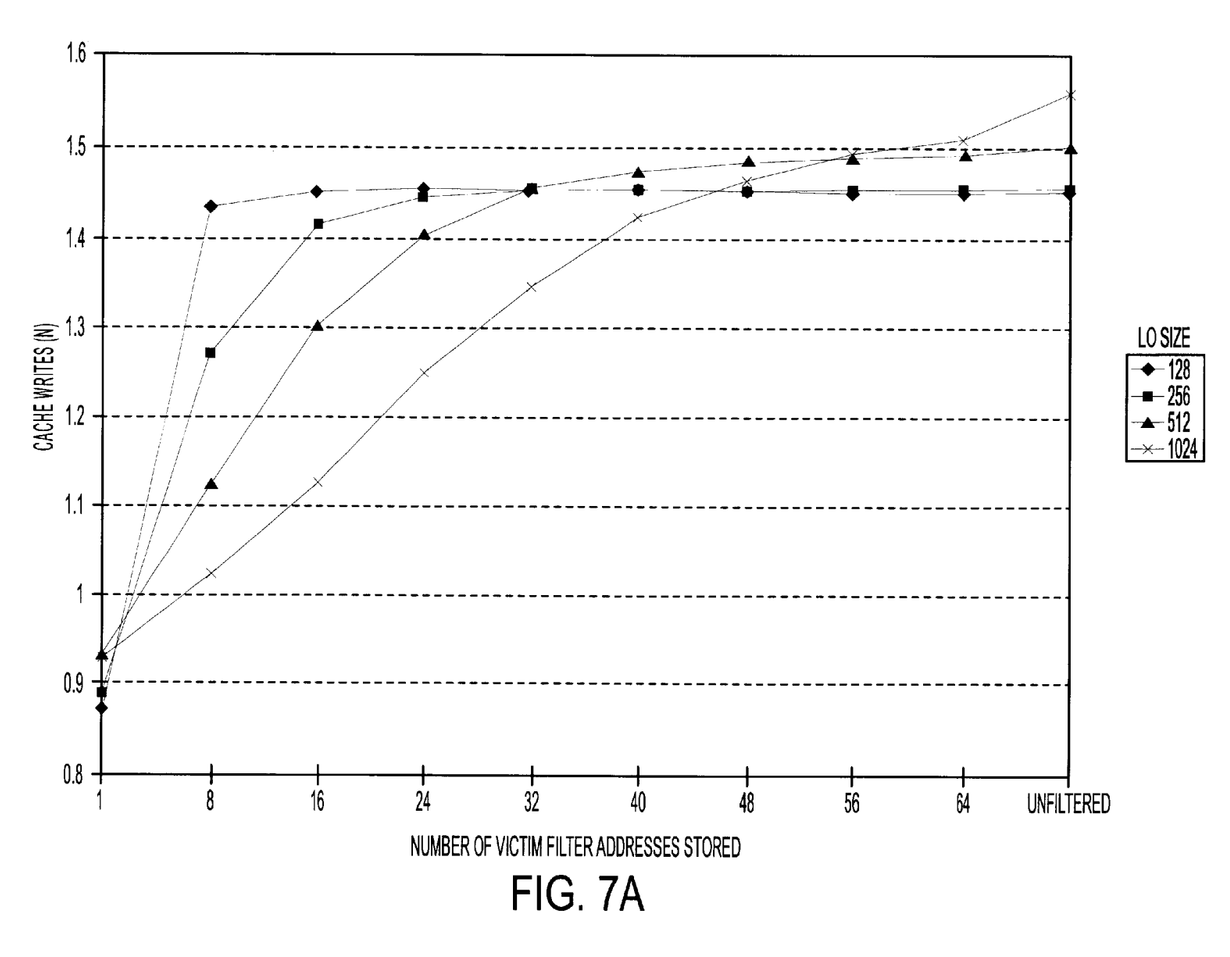
FIG. 7A is a graph of the number of cache writes as a function of the number of addresses stored in the victim filter for various sizes of the L0 cache.
Figure 7B:
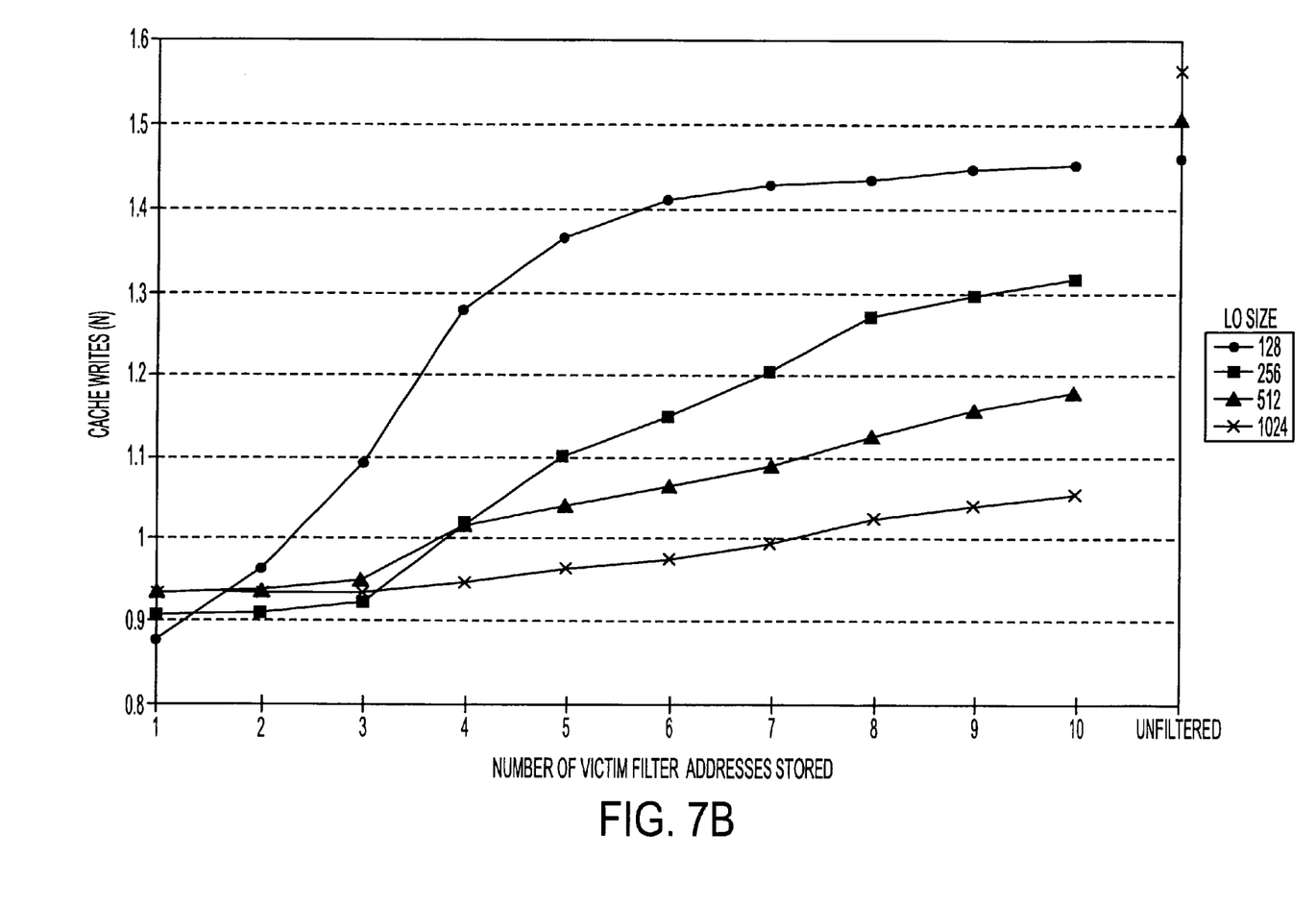
FIG. 7B is a detailed graph of FIG. 7A for victim filters storing from one to ten addresses.

FIGS. 7A and 7B are graphs of the combined number of writes to the L0 and assist caches (y-axis) with respect to the number of addresses stored in the victim filter (x-axis) for various sizes of the L0 cache. For each L0 cache size, the combined number of writes of FIGS. 7A and 7B were normalized to a base cache configuration that does not use the assist cache for that L0 cache size. For example, the results for an L0 cache having a size of 128 bytes with an assist cache were normalized to the results for an L0 cache having a size of 128 bytes without an assist cache. The results for an L0 cache having a size o f256 bytes with an assist cache were normalized to the results for an L0 cache having a size of 256 bytes without an assist cache.

As FIG. 7A shows, a smaller the assist cache reduces the amount of write activity with respect to the base configuration. Therefore, storing fewer addresses causes the victim filter to become very restrictive and retain only the most frequently displaced cache lines in the assist cache. However, as the number of addresses stored in the victim filter increases, the victim filter becomes less restrictive and the amount of memory activity substantially increases.

FIG. 7B shows the results of FIG. 7A in more detail for victim filter sizes ranging from one to ten. Relatively large L0 caches, such as those storing 1,024 bytes (thirty-two cache lines), are relatively unaffected by the size of the victim filter as compared to L0 caches storing 512 bytes or less. Note that, the write activity of the 256 byte (eight cache lines) L0 cache increases significantly when the victim filter stores four or more cache lines.

Significantly, even if the prefetch cache is dynamically assigned to the victim cache, the prefetch filter is not assigned to the victim filter but remains separate. From FIG. 7B, it can be seen that dynamically combining the prefetch filter with the victim filter would increase the number of addresses stored in the victim filter and increase the amount of cache write activity. As a result, power consumption would increase which is inconsistent with one of the goals of the present invention.

Figure 8:
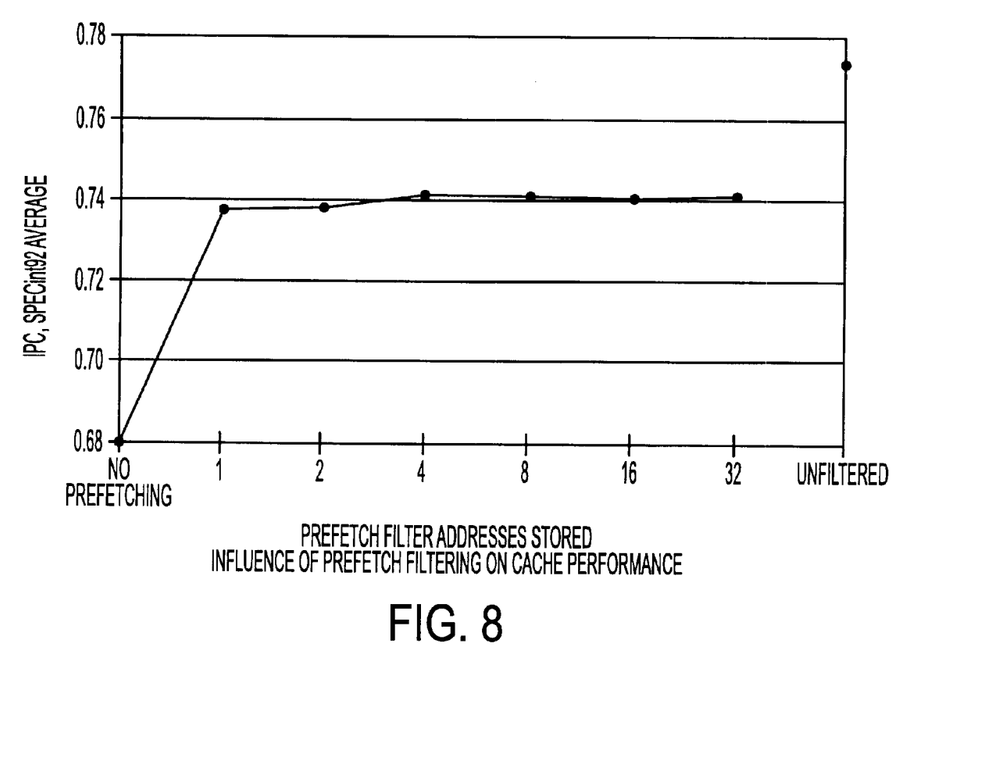
FIG. 8 shows the results of a simulation to determine the number of cache lines to store in the prefetch filter.

FIG. 8 shows the results of a simulation to determine the number of addresses to store in the prefetch filter. In the simulation, the number of addresses was varied from one to thirty-two, and the unfiltered results are shown. The L0 and L1 caches store 256 bytes (8 cache lines) and 16 Kbytes (512 cache lines), respectively. To isolate the effectiveness of the prefetch filter, the simulation results depict the attainable performance with all victim cache lines removed from the assist cache. As shown in FIG. 8, the average number of instructions per cycle (IPC) remains substantially unchanged when the size of the prefetch filter is increased from one to thirty-two. Therefore, the prefetch filter needs to store only one address.

In unfiltered prefetching, the prefetch is initiated on every cache miss or by detecting a hit in the prefetch filter. In filtered prefetching, each occurrence of a miss in both the L0 cache and the victim-designated cache lines of the assist cache caused the next sequential address, such as the address plus one, to be stored in the prefetch filter. Subsequent misses in the L0 and assist cache that hit in the prefetch filter initiated a prefetch of instructions from the L1 cache into the prefetch cache. During prefetching, the assist cache first looks in the L1 cache for the requested cache line. If the cache line was not in the L1 cache, the assist cache initiates a prefetch from the external memory. In the simulation, an external memory access required sixteen cycles.

The prefetch filter limits the amount of memory activity and therefore power consumption. However, the prefetch filter described above improves performance only if single non-sequential memory accesses dominate the memory reference pattern. In an alternate embodiment, for high-performance applications, the processor via the cache control block removes the prefetch filter by forcing a prefetch hit on every cache access.

Other features and advantages of the present invention will become apparent to a person of skill in the art who studies the present invention disclosure. Therefore, the scope of this invention is to be limited only by the following claims.

What is claimed is:

1. A cache system comprising:
    an L1 cache for receiving and storing instructions from an external memory;
    an L0 cache having a first predetermined number L0 of cache lines for receiving and storing instructions from the L1 cache;
    an assist cache having a victim cache with a second predetermined number VC of cache lines and a prefetch cache with a third predetermined number PC of cache lines, the victim cache for receiving instructions from the L0 cache and the prefetch cache for receiving instructions from the L1 cache;
    a victim filter storing a fourth predetermined number VF of addresses wherein VF is a function of the first predetermined number L0 and a number of cache writes, wherein the number of cache writes to the L0 cache and the victim cache is reduced relative to using the L0 cache without the assist cache; and
    a prefetch filter storing a fifth predetermined number PF of addresses, the prefetch filter for determining whether to prefetch instructions stored in certain cache lines of the L1 cache into said prefetch cache, wherein the prefetch filter controls the prefetch cache to prefetch an instruction from the L1 cache after misses to first and second sequential memory locations.

2. The cache of claim 1 wherein VF is equal to three.

3. The cache of claim 1 wherein PF is equal to one.

4. The cache of claim 1 wherein the L1, L0 and assist caches have 32 byte cache lines, the L1 cache is direct mapped and stores 1,024 cache lines, the L0 cache is direct mapped has sixteen cache lines, PC is equal to one and VC is equal to three.

5. The cache of claim 1 wherein the victim filter replaces the least recently used address stored in the victim filter.

6. The cache of claim 1 wherein the prefetch filter has a prefetch memory for storing an address, wherein the address stored is the value of an address following the address of the requested instruction when the requested instruction is not in the prefetch cache.

7. The cache of claim 6 wherein the prefetch filter includes an incrementer, such that the incrementer adds a predetermined increment to the address of the requested instruction, and said incremented address is stored in said prefetch memory.

8. The cache of claim 1 further comprising:
    an assist cache controller for dynamically allocating at least a portion of the cache lines of the prefetch cache to the victim cache.

9. The cache of claim 8 wherein the dynamic assist cache controller dynamically allocates at least a portion of the cache lines of the prefetch cache to the victim cache when an application program is executed.

10. The cache of claim 1 wherein the assist cache is fully associative.

11. The cache of claim 1 wherein the L1 cache is direct mapped.

12. The cache of claim 1 wherein the L0 cache is direct mapped.

13. A method of operating a cache system to interface an execution unit of a processor to a memory, comprising the steps of:
    providing an L1 cache, an L0 cache, a victim cache, a prefetch cache, a victim filter and a prefetch filter, the L1 cache, the L0 cache, the victim cache and the prefetch cache storing at least a portion of an address as a stored address in a cache line as an L1 tag, an L0 tag, a victim tag and a prefetch tag, respectively, the victim filter and the prefetch filter storing at least a portion of the address as a victim filter address and a prefetch filter address, respectively, the cache lines of the L1 cache, the L0 cache, the victim cache and the prefetch cache also storing instructions, wherein the victim filter stores a predetermined number of victim filter addresses that is a function of the number of cache lines of the L0 cache and a number of cache writes, such that a number of cache writes to the L0 cache and victim cache is reduced relative to using the L0 cache without a victim cache;
    supplying a requested address to an address bus to retrieve a requested instruction;
    simultaneously comparing the requested address with the L1 tag, the L0 tag, the victim tag, the prefetch tag, the victim filter address, and the prefetch filter address;
    if a cache hit is detected in a cache line of the L0 cache, providing the requested instruction stored in the cache line to the execution unit;
    if a cache hit is detected in a cache line of the victim cache,
        providing the requested instruction stored in the cache line to the execution unit;
        transferring the cache line storing the requested instruction from the victim cache to the L0 cache; and
    if the requested address misses in both the L0 and victim caches but hits in the L1 cache,
        identifying the cache line storing the requested instruction in the L1 cache,
        identifying a victim cache line in the L0 cache to replace with the identified cache line,
        determining if the requested address matched any of the addresses stored in the victim filter,
        storing the victim cache line in the victim cache based on the matching of the
        requested address of the victim filter of the determining step,
        replacing the victim cache line in the L0 cache with the identified cache line,
        storing the requested address in the victim filter, and
        providing the requested instruction to the execution unit.

14. The method as claimed in claim 13 wherein said step of storing the requested address in the victim filter further comprises the step of:
    storing the victim cache line in a least recently used cache line of the victim filter.

15. The method as claimed in claim 13 further comprising the step of:

generating a prefetch address by incrementing the requested address to a next sequential address;

storing the prefetch address in a prefetch filter;

receiving a new requested address; and prefetching a cache line from the L1 cache into the prefetch cache if the new requested address does not match the prefetch address stored in the prefetch filter, whereby cache lines are prefetched from the L1 cache into the prefetch cache using the prefetch filter after misses to first and second requested sequential addresses.

16. The method as claimed in claim 13 further comprising the step of:

dynamically allocating the prefetch cache to become part of the victim cache to increase the number of cache lines stored in the victim cache, but not allocating the prefetch filter to the victim filter.

17. The cache of claim 1 wherein VF is equal to three.

18. The cache of claim 1 wherein PF is equal to one.

19. The cache of claim 1 wherein the prefetch filter has a prefetch memory for storing an address, wherein the address stored is the value of an address following the address of the requested instruction when the requested instruction is not in the prefetch cache.

20. The cache of claim 1 wherein the L1, L0 and assist caches have 32 byte cache lines, the L1 cache is direct mapped and stores 1,024 cache lines, the L0 cache is direct mapped has sixteen cache lines, PC is equal to one and VC is equal to three.

21. The cache of claim 1 wherein the victim filter replaces the least recently used address stored in the victim filter.

22. The cache of claim 21 wherein the prefetch filter includes an incrementer, such that the incrementer adds a predetermined increment to the address of the requested instruction, and said incremented address is stored in said prefetch memory.

23. The cache of claim 1 further comprising:

an assist cache controller for dynamically allocating at least a portion of the cache lines of the prefetch cache to the victim cache.

24. The cache of claim 23 wherein the dynamic assist cache controller dynamically allocates at least a portion of the cache lines of the prefetch cache to the victim cache when an application program is executed.

25. A cache system comprising:

an L1 cache for receiving and storing instructions from an external memory;

an L0 cache having a first predetermined number L0 of cache lines for receiving and storing instructions from the L1 cache;

an assist cache having a victim cache with a second predetermined number VC of cache lines and a prefetch cache with a third predetermined number PC of cache lines, the victim cache for receiving instructions from the L0 cache and the prefetch cache for receiving instructions from the L1 cache;

a victim filter storing a fourth predetermined number VF of addresses wherein VF is a function of the first predetermined number L0 and a number of cache writes, wherein the number of cache writes to the L0 cache and the victim cache is reduced relative to using the L0 cache without the assist cache; and a prefetch filter storing one address, the prefetch filter for determining whether to prefetch instructions stored in certain cache lines of the L1 cache into said prefetch cache, wherein the prefetch filter controls the prefetch cache to prefetch an instruction from the L1 cache after misses to first and second sequential memory locations.

26. A cache system comprising:

an L1 cache for receiving and storing instructions from an external memory;

an L0 cache having a first predetermined number L0 of cache lines for receiving and storing instructions from the L1 cache;

an assist cache having a victim cache with a second predetermined number VC of cache lines and a prefetch cache with a third predetermined number PC of cache lines, the victim cache for receiving instructions from the L0 cache and the prefetch cache for receiving instructions from the L1 cache;

a victim filter storing a fourth predetermined number VF of addresses wherein VF is a function of the first predetermined number L0 and a number of cache writes, wherein the number of cache writes to the L0 cache and the victim cache is reduced relative to using the L0 cache without the assist cache; and a prefetch filter storing a fifth predetermined number PF of addresses, the prefetch filter for determining whether to prefetch instructions stored in certain cache lines of the L1 cache into said prefetch cache, the determination involving the storing of a prefetch address in the prefetch filter and the storing of a subsequent new requested address in the prefetch filter if the new requested address does not match the prefetch address stored in the prefetch filter.

* * * * *